(12) United States Patent
Takaishi

(10) Patent No.: US 7,352,526 B2
(45) Date of Patent: Apr. 1, 2008

(54) OFFSET MEASUREMENT METHOD FOR MAGNETIC RECORDING HEAD AND MAGNETIC RECORDING/REPRODUCING DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 31 days.

(21) Appl. No.: 11/455,463

(22) Filed: Jun. 19, 2006

(65) Prior Publication Data

US 2007/0230026 A1    Oct. 4, 2007

(30) Foreign Application Priority Data

Mar. 29, 2006    (JP) ............................ 2006-089996

(51) Int. Cl.
*G11B 5/596* (2006.01)
(52) U.S. Cl. .................................................. 360/77.08
(58) Field of Classification Search ............ 360/77.08, 360/77.06, 75, 53, 29; 382/129
See application file for complete search history.

(56) References Cited

U.S. PATENT DOCUMENTS

| | | | | |
|---|---|---|---|---|
| 6,545,836 B1* | 4/2003 | Ioannou et al. | .......... | 360/77.06 |
| 6,865,050 B2* | 3/2005 | Nakao et al. | .................. | 360/75 |
| 6,943,970 B2* | 9/2005 | Takaishi et al. | .............. | 360/29 |
| 7,023,631 B2* | 4/2006 | Zhang et al. | .................. | 360/29 |
| 7,031,088 B2* | 4/2006 | Lee | .............................. | 360/53 |
| 7,106,544 B2* | 9/2006 | Dugas et al. | .................. | 360/75 |
| 7,203,024 B2* | 4/2007 | Lee et al. | ................. | 360/77.08 |
| 2003/0063404 A1* | 4/2003 | Takaishi et al. | .............. | 360/29 |
| 2005/0078860 A1* | 4/2005 | Minor | ......................... | 382/129 |
| 2005/0128632 A1 | 6/2005 | Nakamura et al. | | |
| 2007/0127152 A1* | 6/2007 | Suwa | ....................... | 360/77.08 |
| 2007/0211370 A1* | 9/2007 | Ryu et al. | ................. | 360/77.08 |
| 2007/0212387 A1* | 9/2007 | Patravale et al. | ........... | 424/422 |

FOREIGN PATENT DOCUMENTS

| | | |
|---|---|---|
| JP | 2005-166115 | 6/2005 |
| JP | 2005-166116 | 6/2005 |

* cited by examiner

*Primary Examiner*—Fred F. Tzeng
(74) *Attorney, Agent, or Firm*—Greer, Burns & Crain, Ltd.

(57) ABSTRACT

A storage device has a separate type magnetic head and a discrete type magnetic recording medium on which recording tracks and recording disabled areas are alternately formed. An accurate offset of the magnetic head with respect to the magnetic recording medium is measured even if the widths of the elements of the separate type head differ. While changing the write position and read position of a magnetic recording head, a write element writes measurement data to a magnetic recording medium, a read element reads the written measurement data, and the signal quality is measured and the write offset value and the read offset value are calculated from the inflexion points of a contour line on the two-dimensional map on the measured signal quality. Even if the widths of the write element and the read element differ depending on the individual magnetic recording head, an offset with respect to the separated recording tracks can be accurately measured.

20 Claims, 19 Drawing Sheets

FIG. 10

| WRITE POSITION | READ POSITION | SIGNAL QUALITY |
|---|---|---|
| -L | - M | |
| | - M + dP | |
| | - M + 2dP | |
| | ⋮ | |
| | M | |
| -L + dL | - M | |
| | - M + dP | |
| | - M + 2dP | |
| | ⋮ | |
| | M | |
| ⋮ | ⋮ | ⋮ |
| L | - M | |
| | - M + dP | |
| | ⋮ | |
| | M | |

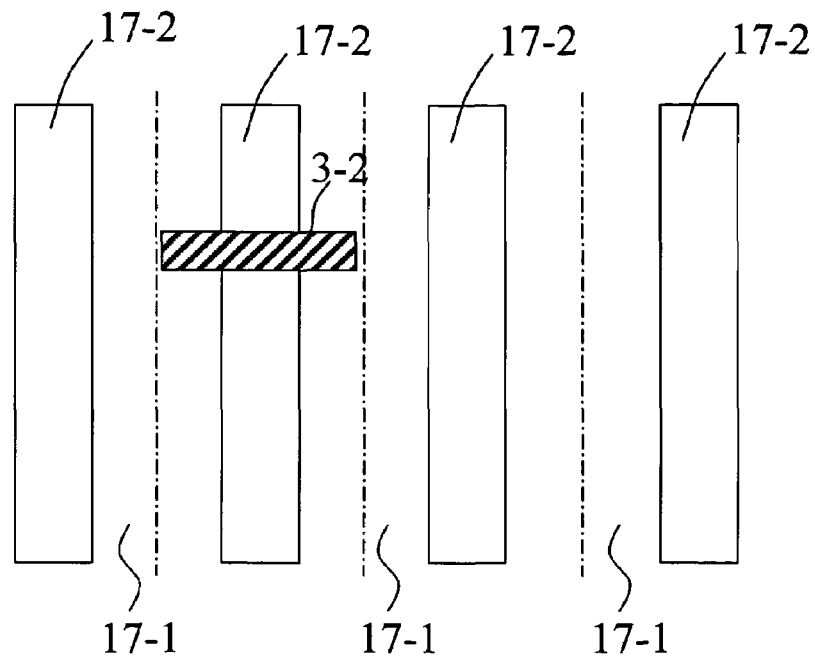
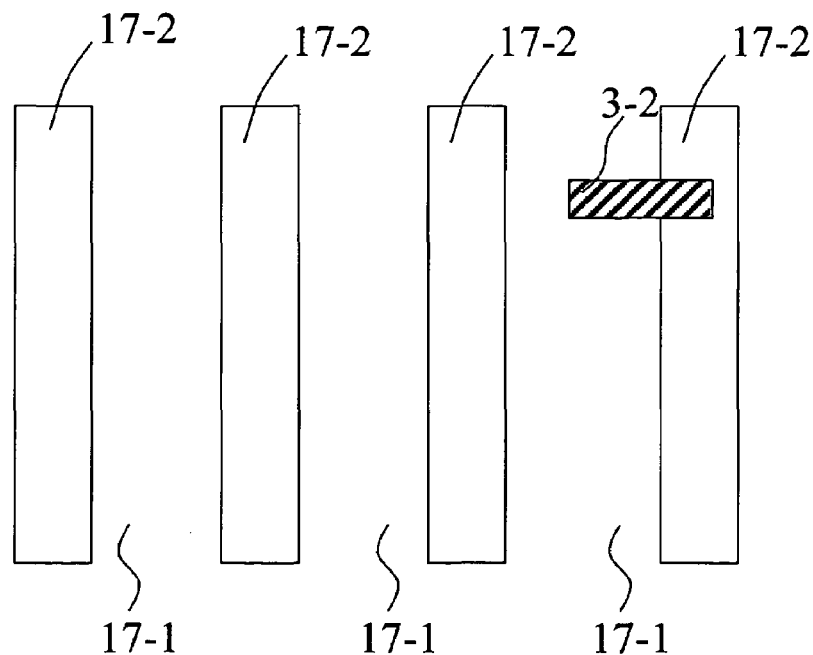

FIG. 17

| HEAD No. | Track No. | Rf | Wf | |
|---|---|---|---|---|
| 1 | 1 | | | ⎫ 24 |
| | ⌇ | | | |
| | 10,000 | | | |
| 2 | | | | |
| ⋮ | | | | |

FIG. 18

| HEAD No. | Track No. | Rf | Wf | |
|---|---|---|---|---|
| 1 | 1 | | | ⎫ 24 |
| | 1000 | | | |
| | | | | |
| | 10,000 | | | |
| 2 | | | | |
| ⋮ | | | | |

_OFFSET MEASUREMENT METHOD FOR MAGNETIC RECORDING HEAD AND MAGNETIC RECORDING/REPRODUCING DEVICE_

CROSS-REFERENCE TO RELATED APPLICATIONS

This application is based upon and claims the benefit of priority from the prior Japanese Patent Application No. 2006-089996, filed on Mar. 29, 2006, the entire contents of which are incorporated herein by reference.

BACKGROUND OF THE INVENTION

1. Field of the Invention

The present invention relates to an offset measurement method for a magnetic recording head and a magnetic recording/reproducing device for controlling the positioning of a magnetic head on a magnetic recording medium where a non-magnetic area is created between magnetic recording tracks, such as a patterned media, and more particularly to an offset measurement method for a magnetic recording head and a magnetic recording/reproducing device for controlling the positioning of a magnetic head, where the reproducing element and recording element are separated, on the magnetic recording medium.

2. Description of the Related Art

In a magnetic disk device, accurately positioning a magnetic head to a target track is extremely important to improve recording density. For a magnetic head of this magnetic disk device, a separate type head in which a reproducing element and recording element are separated is used.

In the separate type head, where the reproducing element and recording element are separated, it is difficult to make the positions of these elements perfectly the same in manufacturing, so the positions of these elements are different. Therefore in order to position the reproducing element and recording element of the separate type head on a track, the positional shift of these elements (offset) must be measured, and according to the measured offset, the recording element of the magnetic head is positioned on a track during write, and the reproducing element of the magnetic head is position on a track during read.

For a magnetic disk device, discrete tracks and patterned media are proposed, other than a conventional disk where a magnetic layer is formed on the entire disk face. FIGS. 20A, 20B and 20C are diagrams depicting the discrete track media and patterned media. As the cross-sectional views of the disks in FIGS. 20A, 20B and 20C show, these disks have tracks which are recording areas, and unrecordable areas are arranged alternately in the radius direction.

For example, in the case of the discrete media in FIGS. 20A and 20B, grooves 301 are formed on the disk substrate 340 with a predetermined space, and the magnetic layer is formed on the entire surface. In FIG. 20A, filler is also formed in the grooves 301. Then the tracks 302, which are recording areas having a magnetic layer on the surface, and a recording disabled area 301 which consists of grooves, are arranged alternately in the radius direction.

Further, in the case of the patterned media in FIG. 20C, a magnetic layer is formed on the disk substrate 304 via a mask used in semiconductors. Then the tracks 302, which are recording areas having a magnetic layer on the surface, and a recording disabled area 301 not having the magnetic layer, are arranged alternately in the radius direction.

Creating a recording disabled area between tracks guarantees the recording contents of each track without receiving the influence of writing on an adjacent track, therefore this is effective to increasing the density of tracks. Particularly this method is effective to prevent influence on an adjacent track due to the side fringing of the recording head of vertical magnetic recording. In the case of this type of disk, on which the recording areas and non-recording areas are alternately arranged, the data tracks 302 are formed in advance, and it is impossible to change the positions later.

Therefore a problem of the device which uses this type of disk is follow up control to the data tracks. For follow up control, measuring the above mentioned offset and follow up control using the offset are required.

FIG. 21 is a diagram depicting a conventional offset measurement method. In the magnetic disk device, of which read element and write element are different, offset between these elements is measured for each position in the radius direction. This offset is measured assuming that the magnetic film is continuously formed in the radius direction.

The servo area 320 is formed even for the discrete track medium. In the servo area 320, however, the servo information is formed by magnetic recording or by pit shaped patterns, separately from the data tracks 302, so error "A" is generated between the position of the data track 302 and the position indicated by the servo information 320.

Possible causes of this error are a position error when servo signals are formed and a position error when data tracks are formed. Generation of an error is inevitable whether a mask equivalent to a semiconductor mask is used or signals are recorded, since ultimately the data is mechanically recorded. While the precision required is at the nanometer level, a position error cannot be suppressed until it becomes negligibly small.

In discrete tracks and pattern media, magnetic films are discontinuously formed in the radius direction. Therefore a correction method different from the disk having a continuous magnetic layer is required.

As FIG. 21 shows, in the conventional proposal, it is assumed that the shift amount "A" between the center C1 of the servo information 320 and the center C2 of the track 302 is constant in each track. And the measurement area 310 is formed between the data area 300, on which the data tracks 302 and non-recording areas 301 are formed, and the servo area 320. The recording element 331 or reproducing element 332 of the magnetic head 330 is placed at the track center in the measurement area 310, and the measurement data is recorded by the recording element 331 and the measurement data is read by the reproducing element 332.

Also while shifting only one of the recording position and reproducing position, recording or reproducing is repeated and the position at which the signal quality peaks is searched, and offset due to the position shift "B" between the recording element 331 and reproducing element 332 is measured as a relative position of the recording element 331 and reproducing element 332 (e.g. Japanese Patent Application Laid-Open No. 2005-166115 and No. 2005-166116).

According to these proposals, the recording element 331 may record measurement data for two tracks 302 when offset is measured, depending on the shift between the servo center C1 and the data track C2, so the offset is measured by creating the measurement area 310 between the data area 300 and the servo area 320.

However because of the recent demand for larger capacities of magnetic disk devices, an increase in the data recording density is required. For this, track density must be increased even in discrete type disks. If the track density is increased, the shift amount A between the center C2 of the data track 302 and the center C1 of the servo information 320 is unknown and differs depending on each disk.

Also the position shift "B" between the recording element and reproducing element of the magnetic head is at the nana level as magnetic heads miniaturize, and producing a magnetic head where this shift "B" is constant is difficult, and also the core width differs between the recording element and reproducing element. Distribution of the signal quality level changes depending on the core widths of the recording element and reproducing element.

Therefore in the prior art, which firstly assumed that the shift amount "A" between the center C2 of the data track 302 and the center C1 of the servo information 320 is known and constant, an offset of a disk in which the shift amount "A" is unknown cannot be measured accurately.

Also in the prior art, a position where the maximum values of signal quality, such as amplitude, S/N ratio and error rate of written signals, is measured as one offset position. However the distribution of the signal quality level changes depending on the widths of the reproducing element and recording element, so the area where the maximum values of the signal quality must be measured more than at one point, so accurate offset measurement is difficult.

SUMMARY OF THE INVENTION

With the foregoing in view, it is an object of the present invention to provide an offset measurement method for a magnetic recording head and a magnetic recording/reproducing device for accurately measuring the offset value of a separate type head, in which a recording element and reproducing element are separated, with respect to the magnetic recording medium on which recording tracks are separated by recording disabled areas.

It is another object of the present invention to provide an offset measurement method for a magnetic recording head and a magnetic recording/reproducing device for accurately measuring the offset value of a separate type head with respect to the magnetic recording medium on which the recording tracks are separated by recording disabled areas, even if the widths of the recording elements and reproducing elements disperse.

It is still another object of the present invention to provide an offset measurement method for a magnetic recording head and a magnetic recording/reproducing device for accurately measuring the offset value of a separate type head, in which the recording element and reproducing element are separated, with respect to the disk, even if the shift between the servo center and the track center of the magnetic recording medium of which the recording tracks are separated by the recording disabled areas is unknown.

It is still another object of the present invention to provide an offset measurement method for a magnetic recording head and a magnetic recording/reproducing device for accurately measuring the offset value of a separate type head in which the recording element and reproducing element are separated with respect to the magnetic recording medium on which recording tracks are separated by the recording disabled areas, without creating a measurement area.

To achieve these objects, an offset measurement method of the present invention is an offset measurement method for a magnetic recording head for measuring offset of the magnetic recording head with respect to a magnetic recording medium on which recording tracks and recording disabled areas are alternately formed, having a step of writing measurement data to the magnetic recording medium by a write element and reading the written measurement data by a read element to measuring signal quality while changing a write position and read position of the magnetic recording head in which the read element and write element are separated, and a step of determining a contour line on a two-dimensional map on the measured signal quality in the changed write position and read position, and calculating a write offset value and read offset value from the inflexion points of the contour line.

A magnetic recording/reproducing device of the present invention has a magnetic recording medium on which recording tracks and recording disabled areas are alternately formed, a magnetic recording head in which a read element for reading data on the recording tracks and a write element for writing data on the recording tracks are separated, an actuator for moving the magnetic recording head in a track crossing direction of the magnetic recording medium, a table for storing an offset value of the read element and an offset value of the write element with respect to the recording track, and a control unit for performing drive control for the actuator using the offset value of the read element and the offset value of the write element of the table. And the table stores the offset values of the write element and the offset value of the read element which are calculated from the inflexion points of a contour line determined from a two-dimensional map on the measured signal quality by writing measurement data on the magnetic recording medium by the write element and reading the written measurement data by the read element, while changing the write position and read position of the magnetic recording head.

In the magnetic recording/reproducing device of the present invention, it is preferable that the control unit executes the measurement processing of the offset value of the write element and the offset value of the read element.

In the offset measurement method of the present invention, it is preferable that the calculation step has a step of selecting a contour line other than the contour line with which signal quality is at the maximum, out of the contour lines on the two-dimensional map, and a step of calculating the write offset value and the read offset value using the inflexion points of the selected contour line.

Also in the offset measurement method of the present invention, it is preferable that the calculation step further has a step of determining a plurality of first inflexion points by differentiating the selected contour line in the write position direction, a step of determining the write offset value from the plurality of first inflexion points, a step of determining a plurality of second inflexion points by differentiating the selected contour line in the read direction, and a step of determining the read offset value from the plurality of second inflexion points.

Also in the offset measurement method of the present invention, it is preferable that the measurement step has a step of reading the servo information formed on the magnetic recording medium by the read element and changing the write position and read position of the magnetic recording head so as to position the magnetic recording head on the recording track, and a step of writing the measurement data on the recording track by the write element at the write position.

Also in the offset measurement method of the present invention, it is preferable that the measurement step further has a step of positioning the magnetic recording head on a measurement target track of the magnetic recording medium, writing a measurement data on the magnetic recording medium by the write element, a step of, while moving the magnetic recording head in the track crossing direction of the magnetic recording medium, reading the written measurement data at each position during the measurement by the read element, so as to measure the signal quality at each position of the movement, and a step of shifting the position of the magnetic recording head and repeating the measurement step.

Also in the offset measurement method of the present invention, it is preferable that the measurement step further has a step of moving the magnetic recording head in the track crossing direction of the magnetic recording medium in the read offset measurement range of the read element.

Also in the offset measurement method of the present invention, it is preferable that the repeating step has a step of shifting the position of the magnetic recording head in a predetermined range with the measurement target track as the center.

Also it is preferable that the offset measurement method of the present invention further has a step of erasing a predetermined range with the measurement target track as the center by the write element.

Also in the magnetic recording/reproducing device, it is preferable that the table stores the offset value of the write element and the offset value of the read element calculated using the inflexion points of a contour line other than the selected contour line with which the signal quality is at the maximum, out of the contour lines on the two-dimensional map.

Also in the magnetic recording/reproducing device of the present invention, it is preferable that the table stores the offset value of the write element calculated from a plurality of first inflexion points determined by differentiating the selected contour line in the write position direction and an offset value of the read element calculated from a plurality of second inflexion points determined by differentiating the selected contour line in the read direction.

Also in the magnetic recording/reproducing device of the present invention, the table stores the offset value of the write element and the offset value of the read element measured by reading servo information formed on the magnetic recording medium using the read element, changing the write position and read position of the magnetic recording head, and writing the measured data on the recording track using the write element at the write position.

Also in the magnetic recording/reproducing device of the present invention, it is preferable that the table stores the offset value of the write element and the offset value of the read element acquired by positioning the magnetic recording head on a measurement target track of the magnetic recording medium, writing a measurement data on the magnetic recording medium by the write element, and while moving the magnetic recording head in the track crossing direction of the magnetic recording medium, reading the written measurement data at each position during the movement by the read element, so as to measure the signal quality at each position of the movement, and repeating the measurement with shifting the position of the magnetic recording head.

Also in the magnetic recording/reproducing device of the present invention, it is preferable that the magnetic recording medium is a magnetic disk.

Also in the magnetic recording/reproducing device of the present invention, it is preferable that the table stores the offset value of the write element and the offset value of the read element of each recording track of the magnetic recording medium.

Also in the magnetic recording/reproducing device of the present invention, it is preferable that the table stores the offset value of the write element and the offset value of the read element of a representative recording track of the magnetic recording medium, and the control unit determines the offset value of the write element and the offset value of the read element on a target track of the magnetic recording head by interpolation of the offset value of the write element and the offset value of the read element on the representative recording track.

In the present invention, while changing the write position and read position of the magnetic recording head, the write element writes measurement data to the magnetic recording medium, and the read element reads the written measurement data, and the signal quality is measured and the write offset value and read offset value are calculated from the inflexion points of a contour line on a two-dimensional map on measured signal quality. So even if the widths of the write element and read element differ depending on the individual magnetic recording head, an offset with respect to the separated recording track can be accurately measured, and even if the servo center and center of the recording track are shifted from each other, an offset can be accurately measured.

BRIEF DESCRIPTION OF THE DRAWINGS

FIG. 10 is a table of the signal quality measurement processing results in FIG. 6;

FIG. 15 is a diagram depicting the reason of the generation of the inflexion points in FIG. 11 to FIG. 14;

FIG. 16 is another diagram depicting the reason of the generation of the inflexion points in FIG. 11 to FIG. 14;

FIG. 17 is the offset table in FIG. 4;

FIG. 18 is the offset table in FIG. 4 according to the second embodiment of the present invention;

DESCRIPTION OF THE PREFERRED EMBODIMENTS

Embodiments of the present invention will be described in the sequence of configuration of magnetic recording/reproducing device, first embodiment of offset measurement, second embodiment of offset measurement and other embodiments, but the present invention is not limited to these embodiments.

Configuration of Magnetic Disk Device

Figure 1:
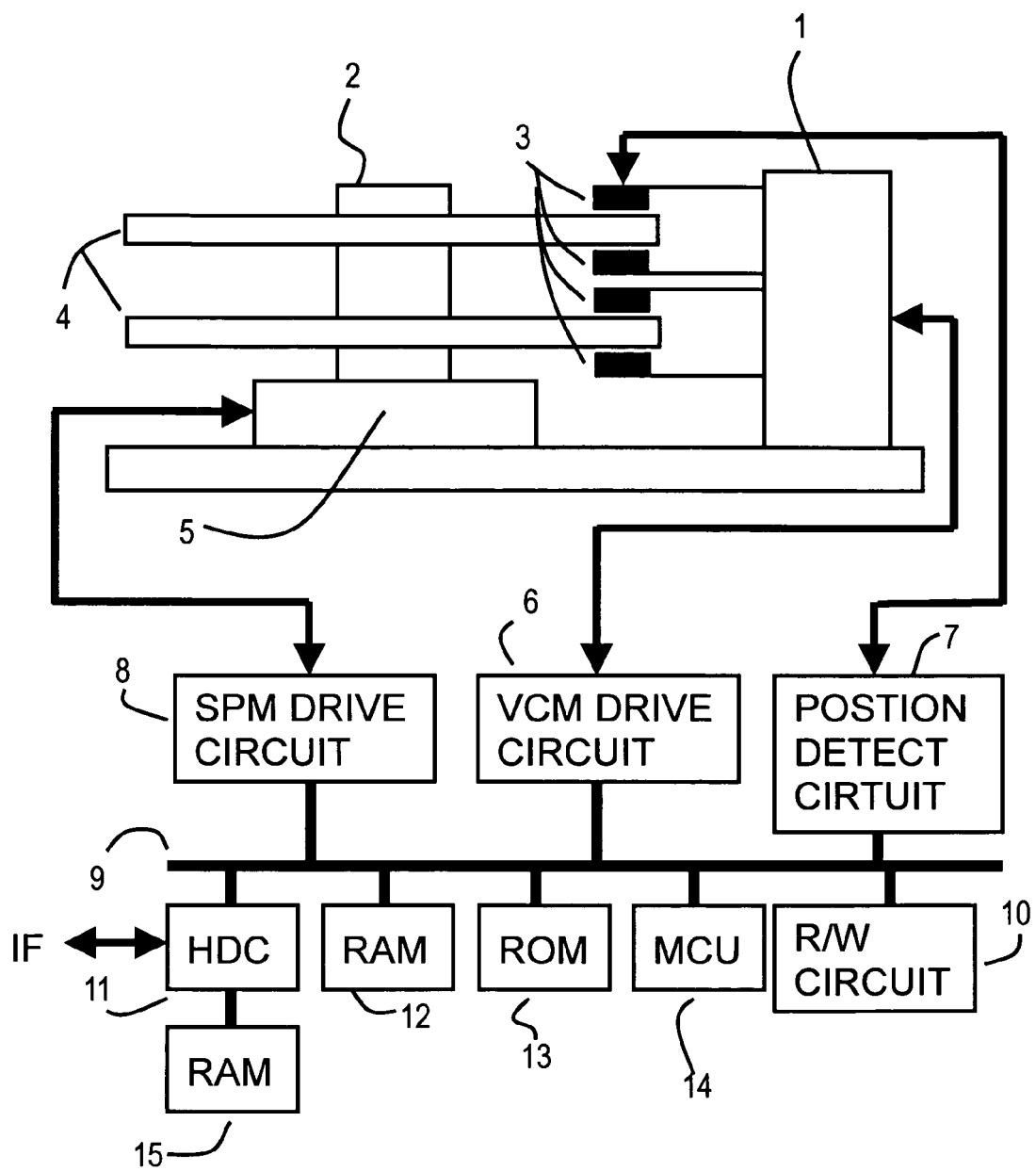
FIG. 1 is a block diagram depicting a magnetic recording/reproducing device according to an embodiment of the present invention.
Figure 2:
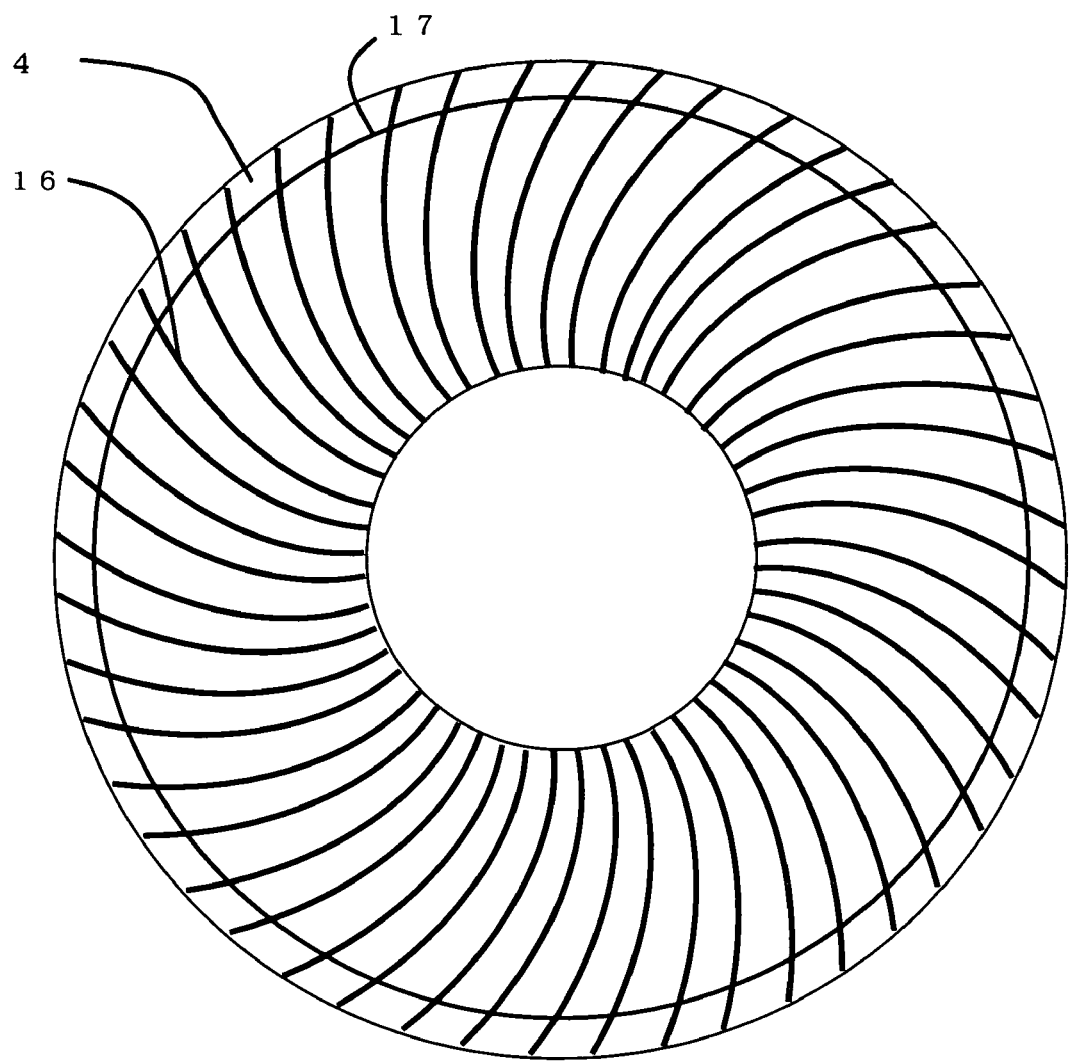
FIG. 2 is a diagram depicting the configuration of the magnetic recording medium in FIG. 1.
Figure 3:
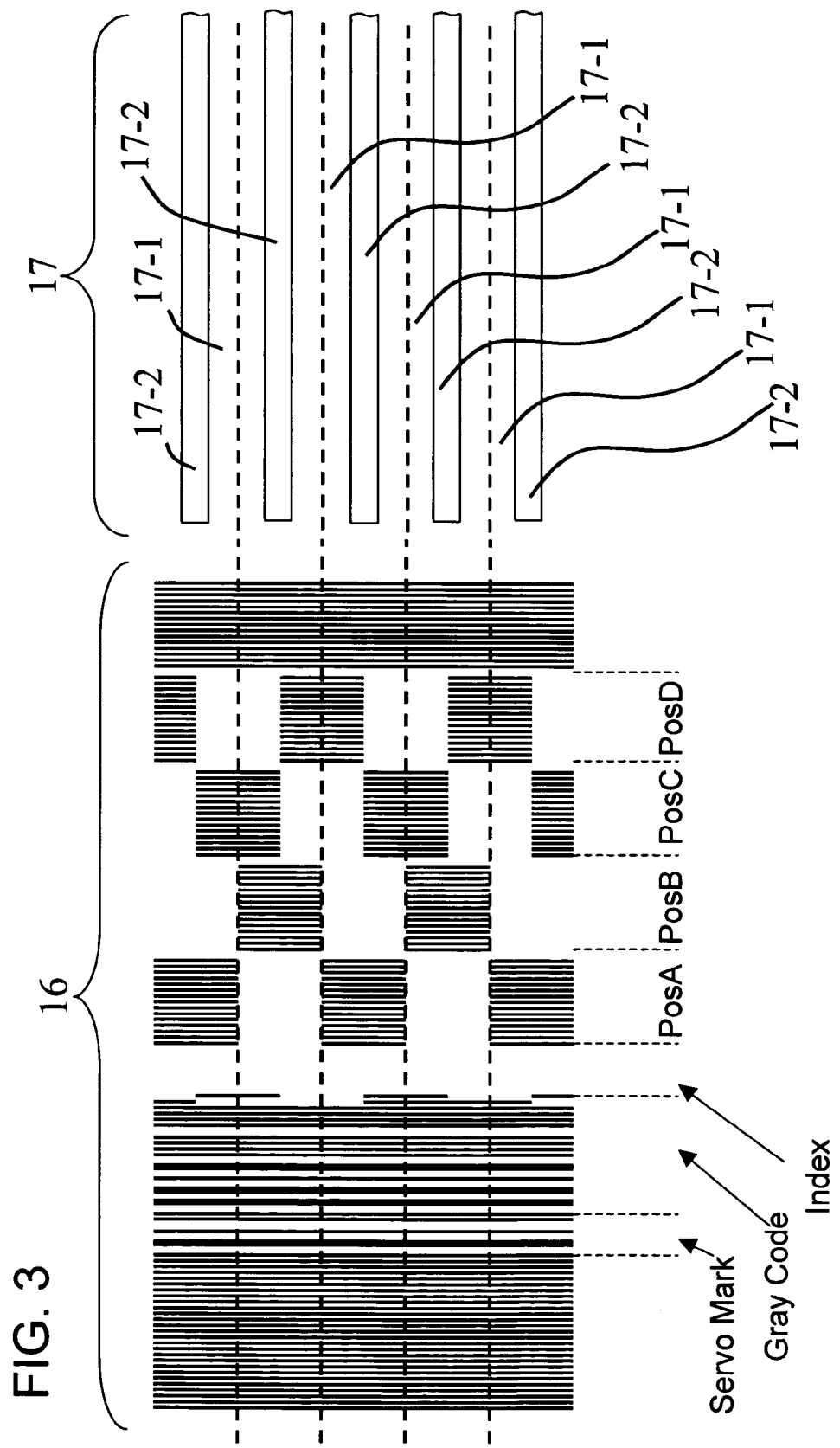
FIG. 3 is a diagram depicting a servo area and separate type data track in FIG. 2.
Figure 4:
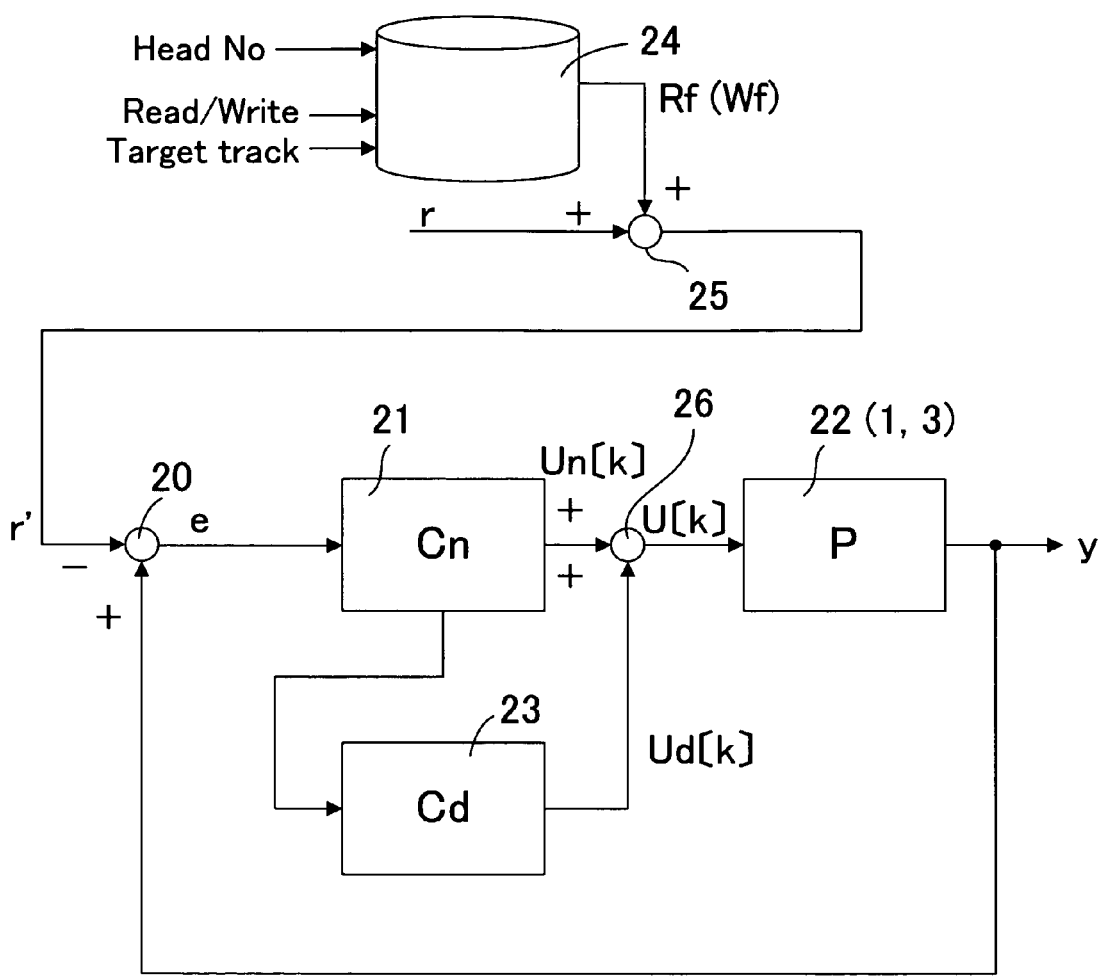
FIG. 4 is a block diagram depicting the servo control system in FIG. 1.
Figure 5:
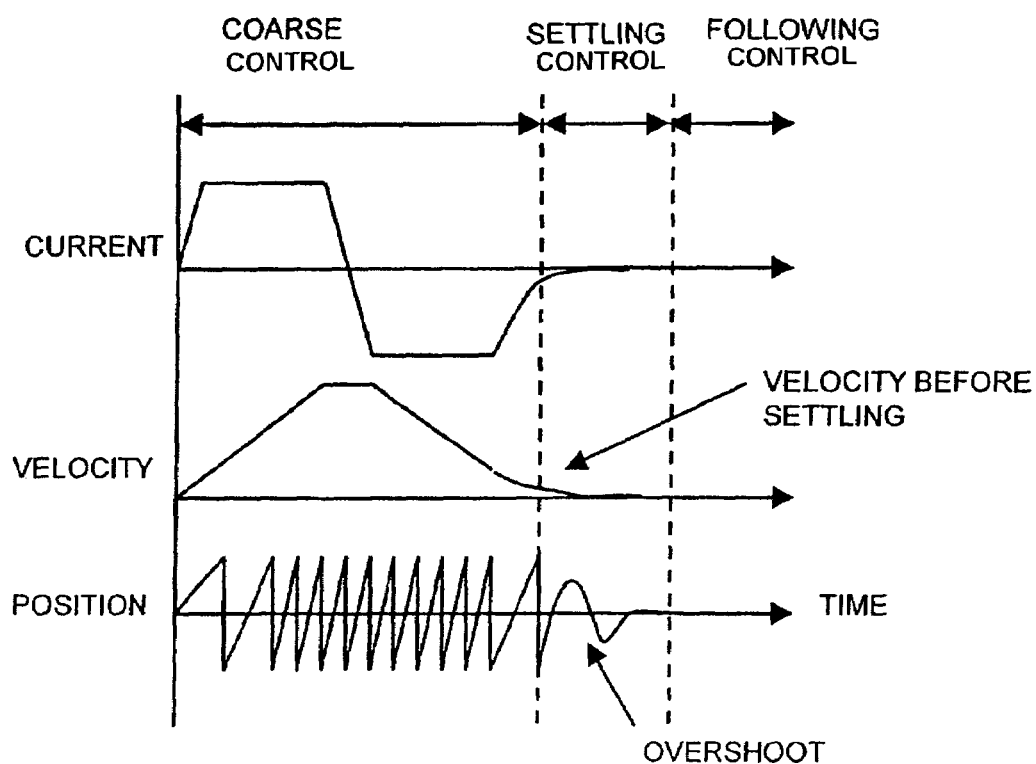
FIG. 5 is a transition diagram depicting the head moving control in FIG. 1 and FIG. 4.

FIG. 1 is a block diagram depicting a magnetic recording/reproducing device according to an embodiment of the present invention, FIG. 2 is a diagram depicting the arrangement of position signals and tracks of the magnetic disk in FIG. 1, FIG. 3 is a diagram depicting the configuration of the position signals and tracks of the magnetic disk in FIG. 1 and FIG. 2, FIG. 4 is a block diagram depicting the head position control system in FIG. 1, and FIG. 5 is a diagram depicting the head position control in FIG. 1 and FIG. 4.

As FIG. 1 shows, the magnetic disk 4, which is a magnetic storage medium, is installed at a rotation axis 2 of a spindle motor 5. The spindle motor 5 rotates the magnetic disk 4. An actuator (VCM) 1 has a magnetic head 3 at the tip, and moves the magnetic head 3 in the radius direction of the magnetic disk 4 by rotation thereof.

The actuator 1 is comprised of a voice coil motor (VCM) which rotates with the rotation axis as the center. In FIG. 1, two magnetic disks 4 are mounted on the magnetic disk device, and four magnetic heads 3 are simultaneously driven by the same actuator 1. This configuration is the same even if there are one magnetic disk 4 and two magnetic heads.

The magnetic head 3 is a separate type head which has a read element and write element. The magnetic head 3 is comprised of a read element, including a magneto-resistance (MR) element stacked on the slider, and a write element including a write coil stacked thereon.

A position detection circuit 7 converts the position signals (analog signals) read by the magnetic head 3 into digital signals. A read/write (R/W) circuit 10 controls the read and write of the magnetic head 3. A spindle motor (SPM) drive circuit 8 drives the spindle motor 5. A voice coil motor (VCM) drive circuit 6 supplies the drive current to the voice coil motor (VCM) 1 and drives the VCM 1.

A micro-controller (MCU) 14 detects (demodulates) the current position from the digital position signals from the position detection circuit 7, and computes the VCM drive instruction value according to the error between the detected current position and the target position. In other words, the micro-controller 14 demodulates the position and performs servo control. A read only memory (ROM) 13 stores the control programs of the MCU 14. A random access memory (RAM) 12 stores the data for processing of the MCU 14.

A hard disk controller (HDC) 11 judges a position in one track based on the sector number of the servo signal and records/reproduces the data. A random access memory (RAM) for the buffer 15 temporarily stores the read data or write data. The HDC 11 communicates with the host via an interface IF, such as USB (Universal Serial Bus), ATA or SCSI (Small Computer System Interface). A bus 9 connects these composing elements.

As FIG. 2 shows, the magnetic disk 4 is a discrete track type magnetic disk. As described later in FIG. 3, the magnetic disk 4 has discrete track areas 17 and servo areas 16 which are arranged in a sector of each track in the circumference direction from the outer circumference to the inner circumference, where servo information is recorded. The solid lines in FIG. 2 indicate a position where the servo information 16 is recorded.

As FIG. 3 shows, in the servo area 16 of the discrete track type magnetic disk 4, the position signals (servo information) are recorded by magnetic recording or by such mechanical patterns as pits from the outer circumference to the inner circumference. This position signals is comprised of a servo mark ServoMark, track number GrayCode, index Index and offset information (servo burst) PosA, PosB, PosC and PosD. The dotted line in FIG. 3 shows the track center of the servo.

Figure 20A:
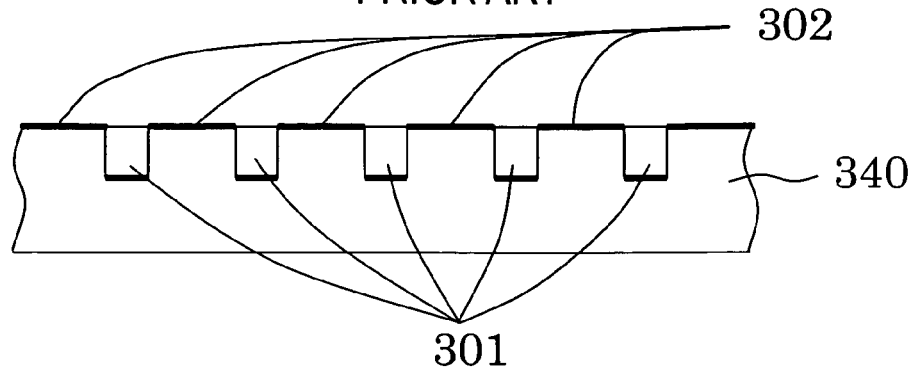
FIGS. 20A, 20B and 20C are diagrams depicting discrete type media according to prior art.
Figure 20B:
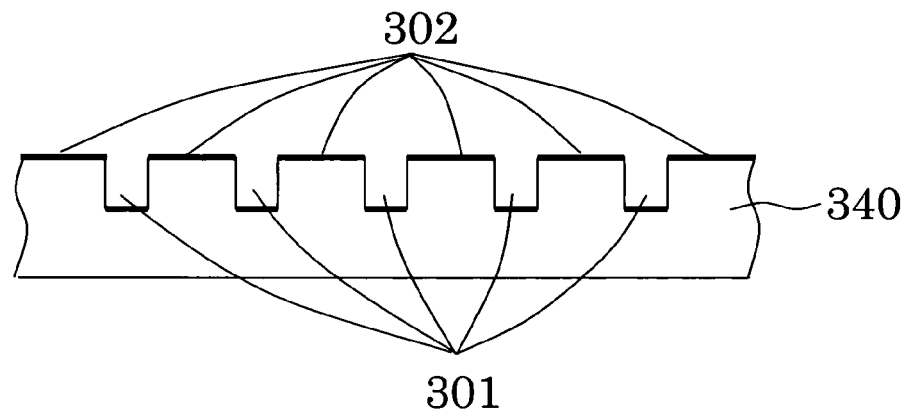
Figure 20C:
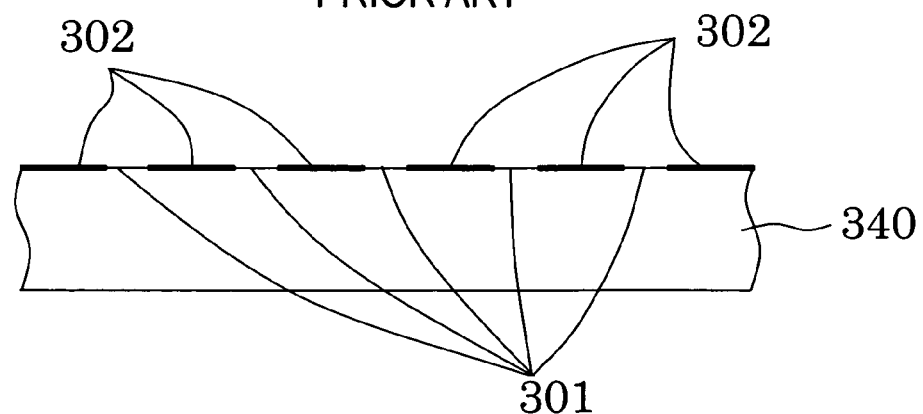
Figure 21:
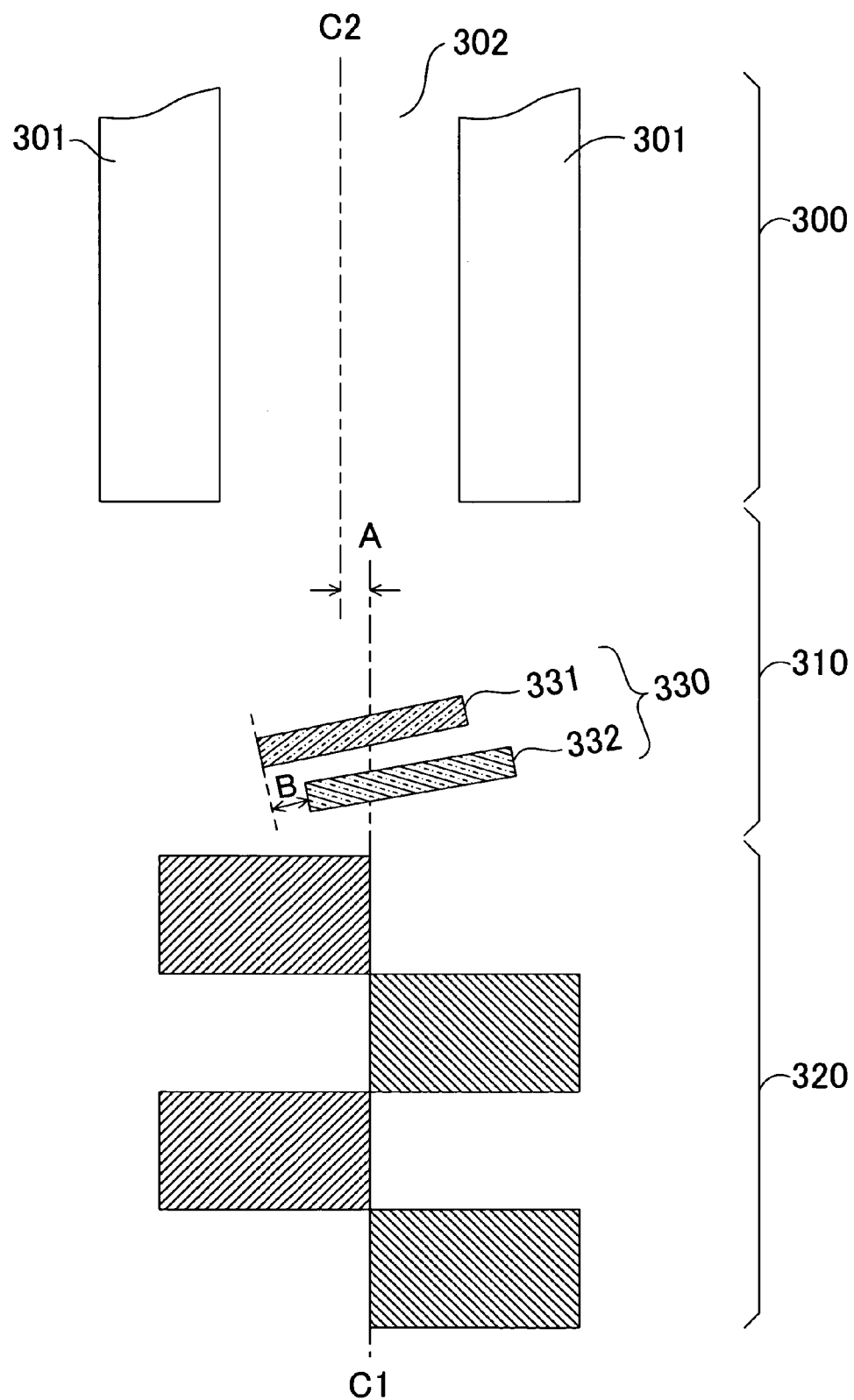
FIG. 21 is a diagram depicting the offset processing of conventional discrete type medium.

In the discrete track area 17, on the other hand, the track 17-1, which is a recording area having a magnetic layer on the surface, and recording disabled area 17-2 are alternately arranged in the radius direction of the disk, as shown in FIG. 20 and FIG. 21. Here the track center of the data track (sector) 17-1 and the track center of the servo of the servo information are matched, but in reality there is a shift.

In the present embodiment, the measurement area which is required for the prior art shown in FIG. 21 is not formed. As described herein below, offset can be measured even if the measurement area is not formed. This can increase the data area for the amount of the measurement area, which is effective to increase storage capacity.

The position signals in FIG. 3 are read by the read element of the head 3, and the position of the magnetic head in the radius direction is detected using the track number GrayCode and offset information PosA, PosB, PosC and PosD. Also the position of the magnetic head in the circumference direction is acquired based on the index signal Index.

For example, the sector number when the index signal is detected is set to No. 0 which is counted up every time the servo signal is detected, so as to acquire the sector number of each sector of the track. The sector number of the servo signal is used as a reference when data is recorded and reproduced. There is one index signal in one track, and the sector number may be set instead of the index signal.

FIG. 4 is a block diagram depicting the operation of the servo control system executed by the MCU 14. A table 24 stores the offset value of the read element and the offset value of the write element of each head for each predetermined position (e.g. each track) in the radius direction of the disk. The table 24 outputs the corresponding read offset value Rf or the write offset value Wf according to the head number used for reading or writing, type of read/write and target track position.

The first operation block 25 adds the read offset value Rf or the write offset value Wf to the target position "r" to compute the target position "r'" for the servo control system. The servo control system computes the position error "e" between the target position "r'" and the current position "y" by the operation block 20, performs control operation, calculates the control amount Un and drives the VCMs 1 and 3, which are a plant 22 by the control block (Cn) 21. For the position of the plant, the servo signal from the magnetic head 3 is demodulated, and the current position "y" is calculated and fed back to the operation block 20.

Also to suppress the disturbance frequency, a disturbance suppression block 23 for generating the disturbance frequency suppression control amount Ud, based on the adaptive control rule, from the internal variables of the control block 21 and position error "e" is installed. The disturbance frequency suppression control amount Ud is added to the control amount Un by the operation block 26, and the VCMs 1 and 3, which are a plant 22, are driven by this added control amount U.

FIG. 5 is an example of the seek control of the actuator executed by the MCU 14 in FIG. 1 and FIG. 4. The MCU 14 confirms the position of the actuator through the position detection circuit 7 in FIG. 1, performs servo computation, and supplies appropriate current to the VCM 1. FIG. 5 shows the transition of the control from the start of seeking, when the head 3 is moved from a certain track position to the target track position, current of the actuator 1, velocity of the actuator (head) and position of the actuator (head).

In other words, in seek control, the head is moved to the target position through the transition from coarse control, settling control and following control (follow up control). Coarse control is basically a velocity control, and settling control and following control are basically position controls for both of which the current position of the head 3 must be detected.

To confirm position in this way, the servo signals are recorded on the magnetic disk in advance, as mentioned in FIG. 2 and FIG. 3. In other words, as FIG. 3 shows, on the magnetic disk, servo marks which indicate the start position of the servo signal, Gray Code which indicates the track number, index signal and signals PosA to PosD which indicate offset are recorded. These signals are read by the magnetic head 3, and these servo signals are converted into digital values by the position detection circuit 7.

And in the present embodiment, the MCU 14 executes offset measurement processing for measuring the offset value of the read element and the offset value of the write element of each head for each predetermined position (e.g. each track) in the radius direction of the disk, which will be described later, and stores the result in the table 24 in FIG. 4.

First Embodiment of Offset Measurement Processing

Figure 6:
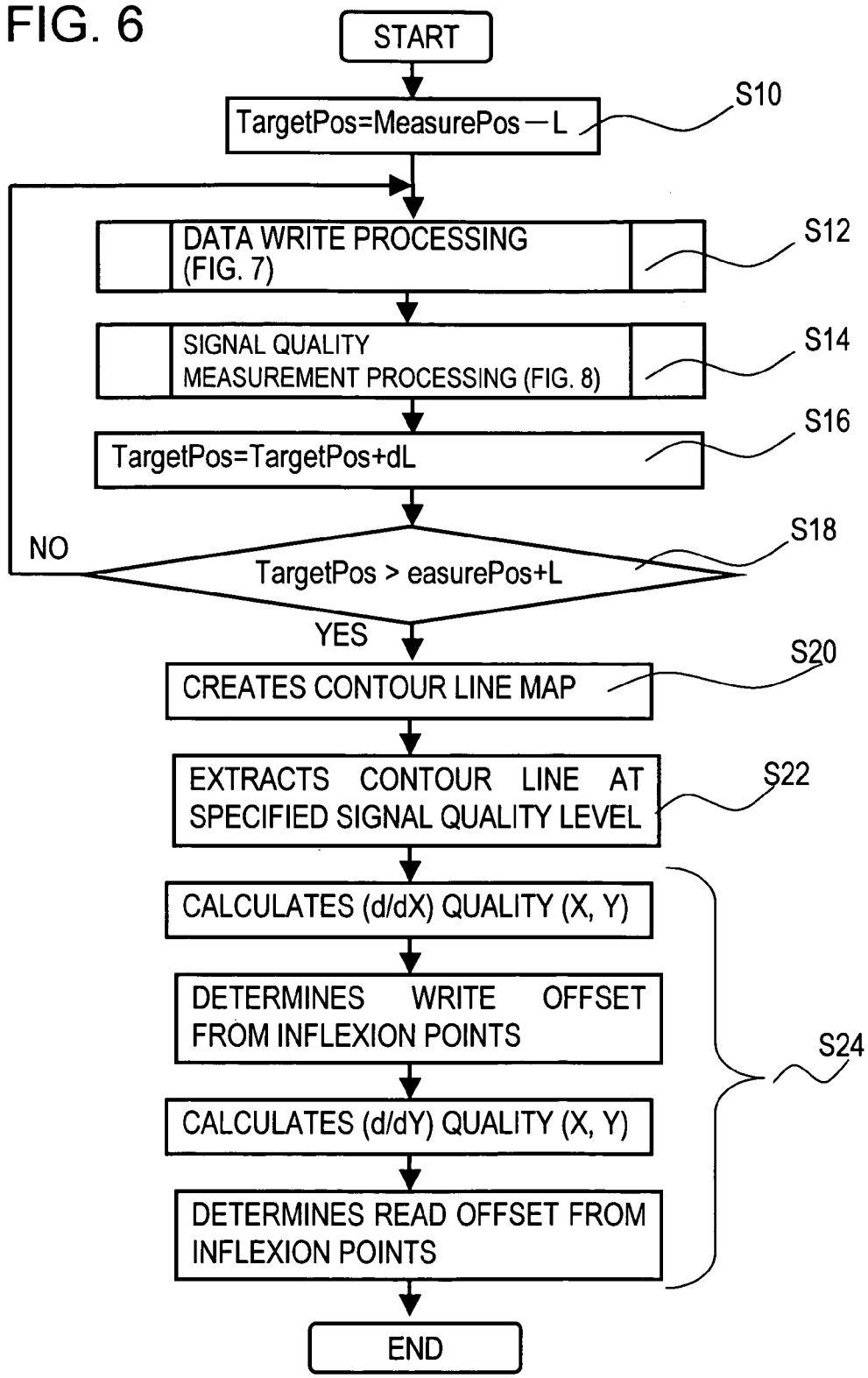
FIG. 6 is a flow chart depicting the offset processing according to the first embodiment of the present invention.
Figure 7:
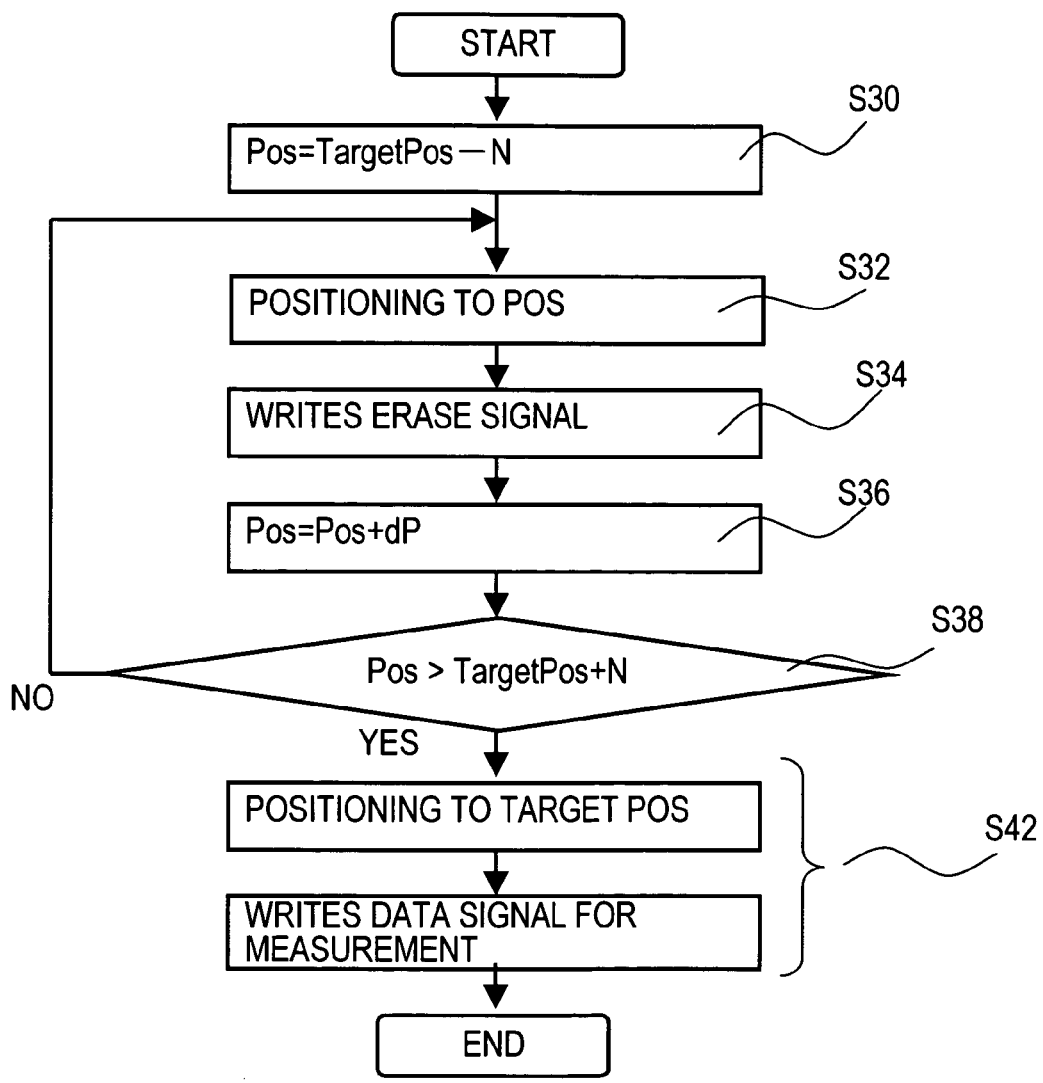
FIG. 7 is a flow chart depicting the data write processing in FIG. 6.
Figure 8:
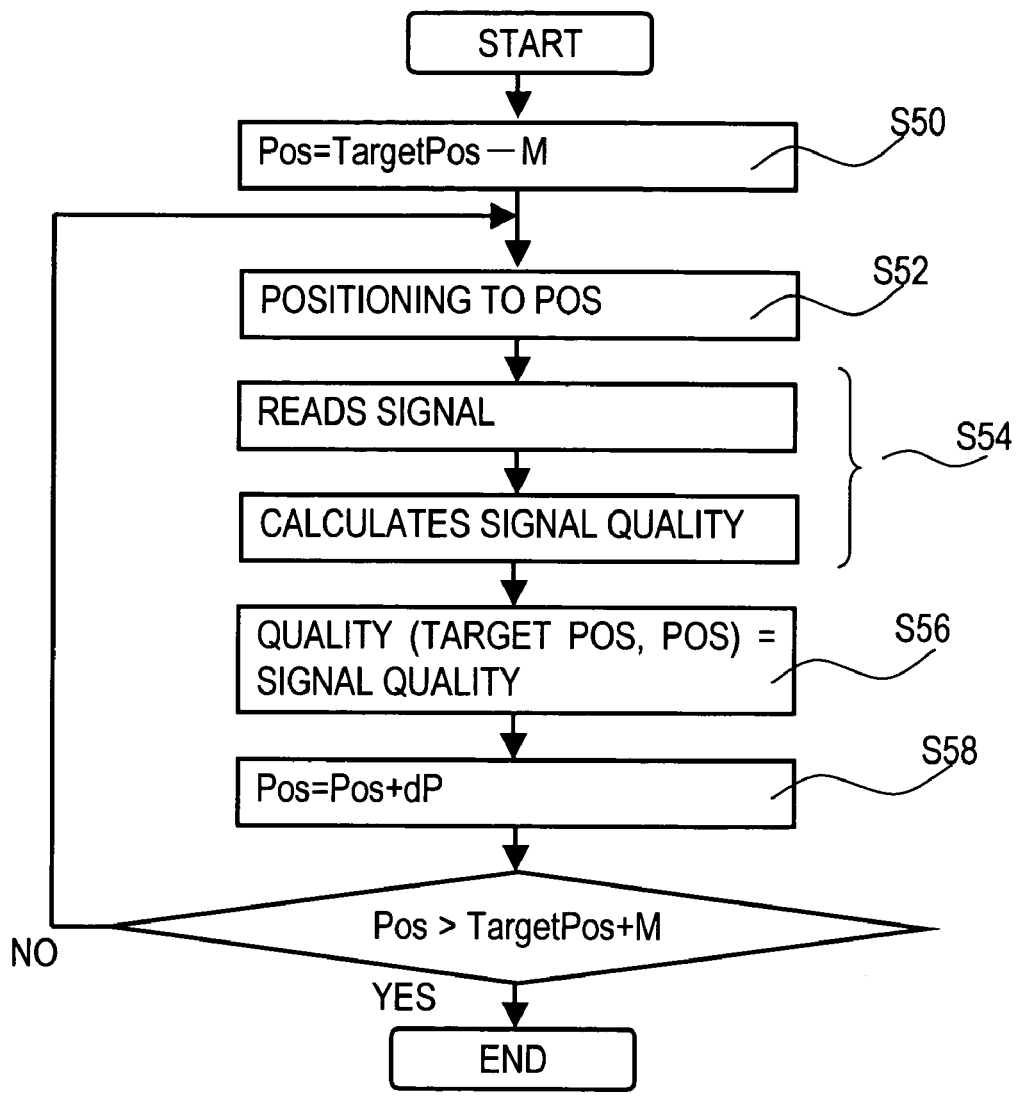
FIG. 8 is a flow chart depicting the signal quality measurement processing in FIG. 6.
Figure 9:
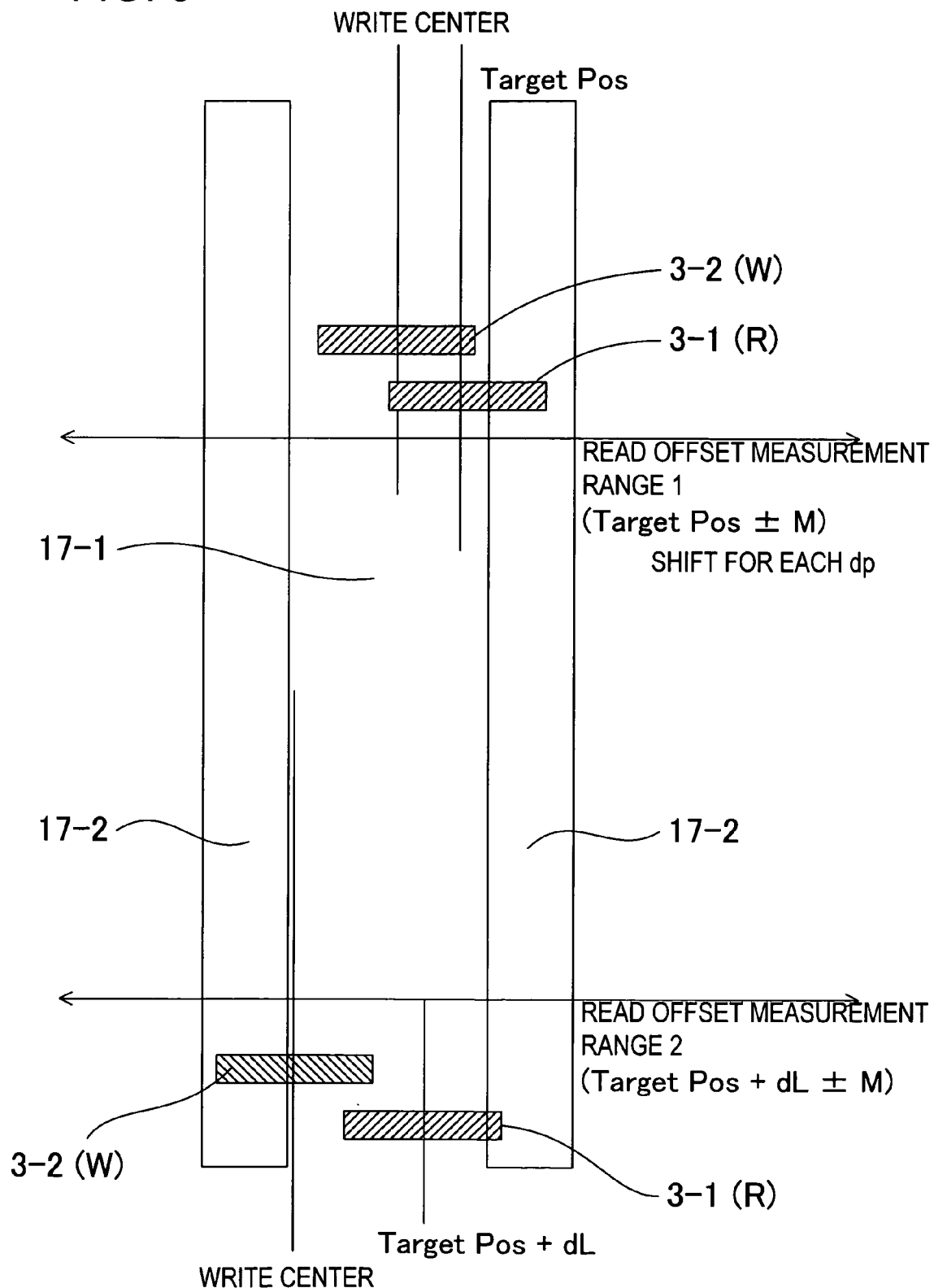
FIG. 9 is a diagram depicting the signal quality measurement processing in FIG. 6.
Figure 11:
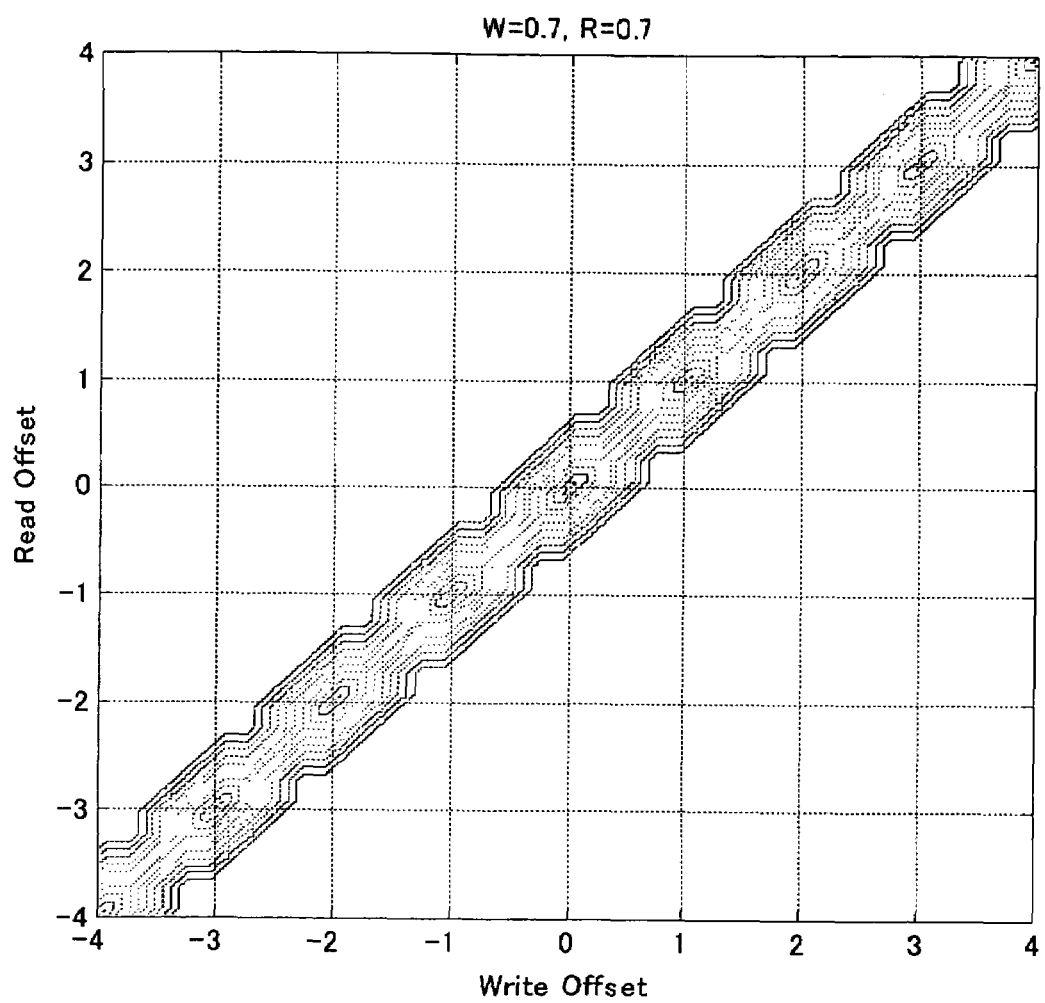
FIG. 11 is a diagram depicting a contour line map in FIG. 6.
Figure 12:
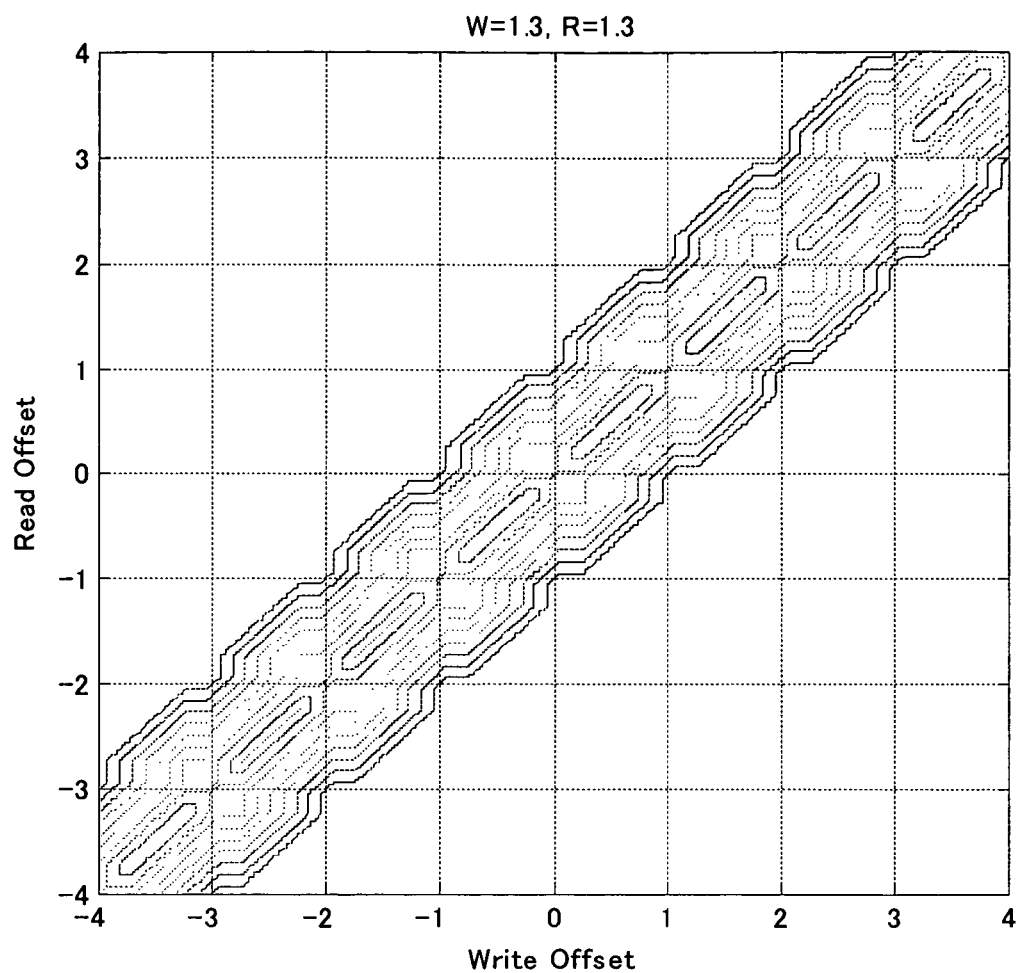
FIG. 12 is a diagram depicting another contour line map in FIG. 6.

FIG. 6 is a flow chart depicting the offset value measurement processing of the read element and write element of the present invention, FIG. 7 is a flow chart depicting the data write processing in FIG. 6, FIG. 8 is a flow chart depicting the signal quality measurement processing in FIG. 7, FIG. 9 is a diagram depicting the data write and signal quality measurement processing in FIG. 6 to FIG. 8, FIG. 10 is a table showing the measurement result in FIG. 6, FIG. 11 and FIG. 12 are diagrams depicting the contour line map creation processing in FIG. 6, and FIG. 13 to FIG. 16 are diagrams depicting the write offset and read offset calculation processing in FIG. 6.

The measurement processing in FIG. 6 will be described with reference to FIG. 7 to FIG. 16.

(S10) It is assumed that the target track is Target Pos, the measurement track is Measure Pos, and the offset measurement range for this track is ±L (e.g. about 10 tracks). First the MCU 14 calculates the target track Target Pos by (measurement track −L).

(S12) Then the MCU 14 drives the actuator 1 and positions the magnetic head 3 to (measurement track −L). In this case, as FIG. 9 shows, the read element 3-1 of the magnetic head 3 reads the servo information in FIG. 3 for positioning, so the magnetic head is positioned on the data track 17-1 so that the read element 3-1 comes to the track center position of the servo information, and the write element 3-2 is positioned at a position distant from the read element 3-1 for the shift amount (called the "write center").

And data write processing, to be described in FIG. 7, is performed. As mentioned later, in this data write processing, a wide range of an area, of which center is this positioned track to be the reference, is erased. Then as FIG. 9 shows, the write element 3-2 writes the measurement data at the above mentioned position where the write element is positioned.

(S14) Then as FIG. 9 shows, the written signals are detected while offsetting the read element 3-1 in the ±M range in the track crossing direction, and the signal quality for each read position at this write position is measured. This signal quality measurement processing will be described later in FIG. 8.

(S16) The MCU 14 updates the target track Target Pos to (Target Pos+dL).

(S18) The MCU 14 judges whether the updated Target Pos is outside the measurement range of measurement track Measure Pos+L or more. If updated Target Pos is not the measurement track Measure Pos+L or more, the MCU 14 returns to step S12, shifts the write position for dL, erases the wide range of an area again, and repeats the same operation. Then as FIG. 9 shows, the signal quality measurement processing is repeated while the write position is shifted as 2dL and 3dL.

(S20) If the updated Target Pos is outside the measurement range of the measurement track Measure Pos +L or more, the MCU 14 ends the measurement of the signal quality at each write position and read position in the measurement range. FIG. 10 is a table showing the measurement result. In other words, as described in FIG. 9, this signal quality table is acquired by measuring the measurement data, written at each write position (−L to +L) which is shifted with each dL distance, at each read position (−M to +M) which is shifted with each dp distance. Based on the contents of this table, a two-dimensional map of the signal quality of each read position (read offset position) and each write position (write offset position) is drawn. FIG. 11 is a diagram depicting the two-dimensional map of the signal quality of which the abscissa is the write offset position and the ordinate is the read offset position, wherein the contour line indicates better signal quality as the contour line becomes closer to the center of the solid line portion. Inflexion points appear in the contour line, because data is also written to the recording disabled area when the data is written to the data track between the reading disabled area, that is to a discrete track.

(S22) From this two-dimensional map, a contour line of which signal quality is not at the maximum is determined. In other words, a contour line of which signal quality is neither at the maximum nor minimum, is extracted.

(S24) From this contour line, a read offset value and a write offset value are determined. First the meaning of determining the offset values from the contour line will be described. FIG. 11 shows the simulation result when the widths of the read element and write element are narrower (=0.7) than the track width (1.0), and FIG. 12 shows the simulation result when the widths of the read element and write element is wider (=1.3) than the track width. In this example, the write characteristic and read characteristic are both rectangular, and the offset between the read element and the write element is constant (=0).

As the contour line in FIG. 11 shows, if the read element width is narrower than the track width, the read offset position or write offset position with which the signal quality values becomes the maximum is not at one point, but has a certain range. In other words, according to this example, both the read offset position and the write offset position have a maximum value at one point, "0", but in the contour lines, more than one point has the maximum value.

Also as FIG. 12 shows, if the read element width or write element width is wider than the track width, the read offset position or write offset position with which the signal quality value is at the maximum is shifted from the track center "0" (both read offset position and write offset position).

This means that in the case of a discrete track, the maximum value of signal quality cannot be acquired by offset from the track center, depending on the difference of the read element width and write element width. Therefore an offset value with which the signal quality seems to be at the maximum is determined not by measuring the maximum value of the signal quality, but by using a curve of a contour line of which values are smaller than the maximum value.

Figure 13:
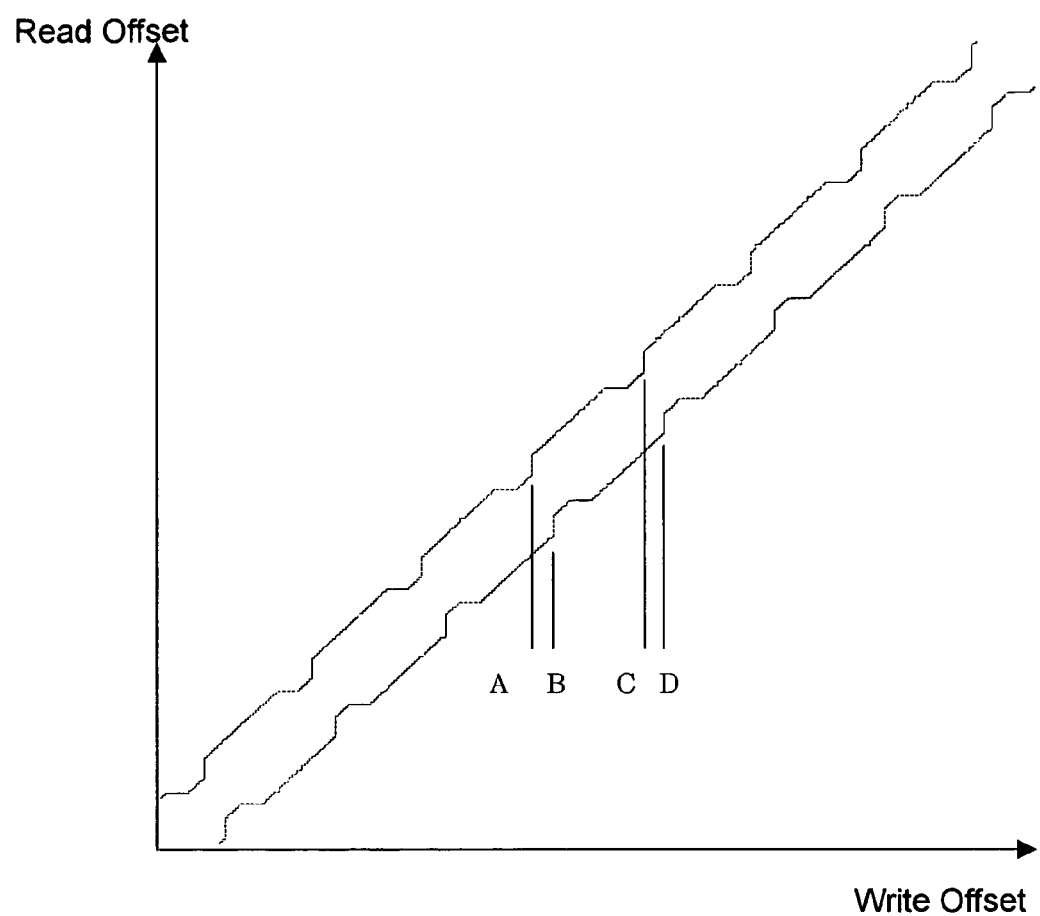
FIG. 13 is a diagram depicting the write offset value calculation processing by the inflexion points in FIG. 6.

FIG. 13 is a diagram depicting the calculation processing of the write offset value. The inflexion points A, B, C and D of the extracted contour line are selected. And the write offset value is determined by one of (1) (A+D)/2, (2) (B+C)/2 and (3) (A+B+C+D)/4.

Figure 14:
FIG. 14 is a diagram depicting the read offset value calculation processing by the inflexion points in FIG. 6.

FIG. 14 is a diagram depicting the calculation processing of the read offset value. The inflexion points E, F, G and H of the extracted contour line are selected. And the read offset value is determined by one of (1) (E+H)/2, (2) (F+G)/2 and (3) (E+F+G+H)/4.

Now the reason why inflexion points appear will be described with reference to FIG. 15 and FIG. 16. As FIG. 15 shows, if the width of the write element 3-2 is wider than the width of the discrete track 17-1, and if the write element 3-2 records the data extending over the recording disabled area 17-2, then the recording level of the data recorded in the track 17-1 itself is low, so the signal level in reading by the read element becomes low no matter how the read offset is changed.

In the same way, if the width of the write element 3-2 is narrower than the width of the discrete track 17-1, as shown in FIG. 16, and if the write element 3-2 records the data partially on the recording disabled area 17-2, then the recording level of the data recorded in the track 17-1 itself is low, and the signal quality in reading by the read element becomes low no matter how the read offset is changed.

These inflexion points are acquired by differentiating the curve of the contour line in the write offset position axis direction (X direction in FIG. 13) and read offset position axis direction (Y direction in FIG. 14), and by determining the points where the differential value becomes higher than other points. And using the above calculation formula, the write offset value and the read offset value are calculated.

This measurement is performed for each head and for each radius position. The reason why not only the write offset value but also the read offset value is measured here is that a shift of the detection sensitivity of the read element of the head and the servo pattern formation accuracy may occur. As described in FIG. 21 and FIG. 3, the read element does not position at the position of offset "0" indicated by the servo information 16, that is the center of the data track 17-1 at 100%, and a shift is generated due to the above mentioned formation accuracy, and the shift amount differs depending on the disk. Therefore it is necessary to calibrate this shift in each disk and head.

Values measured like this are stored in a non-volatile memory. FIG. 17 is a measurement value storage table 24 (see FIG. 4). The read offset value Rf and the write offset value Wf are stored for each head and for each track.

Now the data write processing in FIG. 6 will be described with reference to FIG. 7.

(S30) The target position Target Pos−N described in FIG. 6 is initially set to the target position Pos. Here N indicates the erase area.

(S32) Then the MCU 14 drives the actuator 1 and positions the magnetic head 3 to the target position Pos. In this case, as FIG. 9 shows, the read element 3-1 of the magnetic head 3 reads the servo information in FIG. 3 and positions, so the read element 3-1 is positioned on the data track 17-1 so as to be on the track center position of the servo information, and the write element 3-2 is positioned at a position distant from the read element 3-1 for the shift amount (write center).

(S34) And the MCU 14 has the write element 3-2 write the erase signal.

(S36) The MCU 14 updates the target position Pos to (Pos+dp).

(S38) The MCU 14 judges whether the updated target position Pos is outside a predetermined erase range, which exceeds (Target Pos+N). If it is judged that the updated target position Pos is not outside the erase range, the MCU 14 returns to step S32, and performs the erase operation.

(S40) If it is judged that the updated target position Pos is outside the erase range, the MCU 14 judges that a wide area with the target track as the center was erased. And the MCU 14 drives the actuator 1, positions the magnetic head 3 to the target position Target Pos, and writes the measurement data by the write element 3-2 at the position where the magnetic head 3 is positioned.

In this way, a wide range of an area with the track to be the reference as the center is erased, so previous measurement data can be erased, and accurate offset measurement becomes possible.

Now the signal quality measurement processing in FIG. 6 will be described with reference to FIG. 8.

(S50) The target position Target Pos-M described in FIG. 6 is initially set to the target position Pos. Here M indicates the read offset measurement range of the read element 3-1 described in FIG. 9.

(S52) Then the MCU 14 drives the actuator 1 and positions the magnetic head 3 to the target position Pos. In this case, as FIG. 9 shows, the read element 3-1 of the magnetic head 3 reads the servo information in FIG. 3 and positions, so the read element 3-1 is positioned on the data track 17-1 so as to be on the track center position of the servo information, and the write element 3-2 is positioned at a position distant from the read element 3-1 for the shift amount (write center).

(S54) And the MCU 14 has the read element 3-1 read the signal at the position, and calculates the signal quality. For the signal quality, any of amplitude, S/N ratio and error rate may be used.

(S56) As described in FIG. 10, the MCU 14 stores the calculated signal quality in the table of the write position and read position.

(S58) The MCU 14 updates the target position Pos to (Pos+dp). And the MCU 14 judges whether the updated target position Pos is outside a predetermined read offset measurement range, which exceeds (Target Post+M). If it is judged that the updated target position Pos is not outside the read offset measurement range, the MCU 14 returns to step S52, and performs the measurement processing operation. If it is judged that the updated target position Pos is outside the read offset measurement range, the MCU 14 ends the processing.

In this way, a wide range of an area with the track to be the reference as the center is erased, then data is written at the reference position, the written signals are detected while the magnetic head is offset in the radius direction, and the signal quality at each read position is measured in the write position. A wide range of an area is erased again, the write position is shifted only for dX, and the above operation is repeated. Then the same signal quality measurement is repeated while shifting the value as 2dX and 3dX.

This offset table 24 is created in various testing steps in the manufacturing process of the magnetic disk device. By storing this measurement processing program in the ROM 13 of the MCU 14 in advance, re-measurement becomes possible in the field after factory shipment as a part of the calibration processing. In this case, optimum offsets according to the characteristic fluctuation of the read element and write element can be set.

Second Embodiment of Offset Measurement Processing

FIG. 18 is a table of offset measurement processing according to the second embodiment of the present invention. In the above mentioned offset table 24, the read offset value Rf and the write offset value Wf of a representative track in the radius direction of the disk 4 are stored.

In other words, in the case of the above first embodiment, offset values are measured on all the tracks of the disk face, and the read offset value Rf and the write offset value Wf of all the tracks are stored in the table 24 (FIG. 17). In the case of the present embodiment, the offset value is measured on representative tracks "1", "1000", . . . "10000" at a 1000 track interval, for example, and the values are stored in the table 24.

For determining the read offset or write offset, the offset values of two representative tracks with respect to the target tracks are read, interpolated, and the offset values of the target tracks are determined. In this way, the measurement time can be decreased, and the storage capacity of the table 24 can also be decreased.

Other Embodiments

Figure 19:
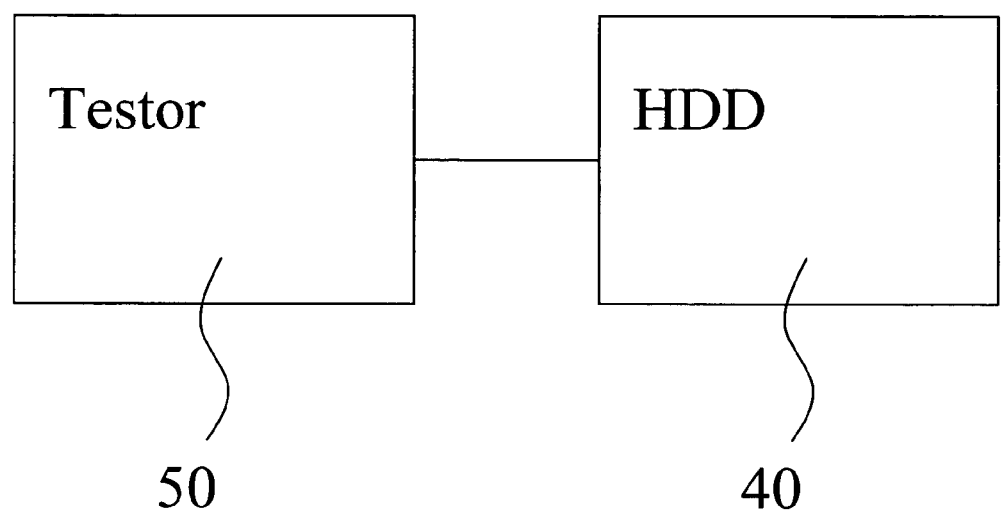
FIG. 19 is a diagram depicting the offset measurement processing according to the third embodiment of the present invention.

FIG. 19 is a diagram depicting the offset measurement processing according to the third embodiment of the present invention. In the above embodiment, the magnetic disk device has the measurement processing function, but the measurement device 50 may be connected to the magnetic disk device 40 so that the measurement device 50 controls the magnetic disk device 40, executes the above measurement processing, and writes the measured offset values in the table 24 of the magnetic disk device 40.

By this, the measurement processing can be executed by a dedicated device, and high-speed processing can be implemented, and also the measurement program need not be stored in the ROM of the magnetic disk device, so the memory capacity of the magnetic disk device can be decreased, which contributes to decreasing cost.

For the first embodiment as well, the measurement program may be downloaded to the RAM of the magnetic disk device, so that the magnetic disk device 40 executes the above measurement processing, writes the measured offset values to the table 24 of the magnetic disk device 40, and erases the measurement program.

Also a discrete type of disk was used for description of the configuration in FIG. 9 and FIG. 20, but any magnetic recording medium on which data tracks and recording disabled areas are alternately formed can be used, and the shape is also not limited to a disk. The recording type for the present invention to be applied can be both horizontal recording or vertical recording, and the measured offset values may be stored in the recording tracks of the disk, such as the system area of the magnetic disk.

While changing the write position and read position of a magnetic recording head, a write element writes the measurement data to a magnetic recording medium, a read element reads the written measurement data, and signal quality is measured and the write offset value and read offset value are calculated from the inflexion points of a contour line on the two-dimensional map on the measured signal quality. So even if the widths of the write element and read element differ depending on the individual magnetic recording head, an offset with respect to the separated recording tracks can be accurately measured, and even if the servo center and the center of the recording track are shifted from each other, an offset can be accurately measured, therefore the present invention contributes to an increase in the storage capacity of a magnetic recording medium having discrete type tracks and a magnetic recording/reproducing device using this medium.

What is claimed is:

1. An offset measurement method for a magnetic recording head for measuring offset of the magnetic recording head with respect to a magnetic recording medium on which recording tracks and recording disabled areas are alternately formed, comprising the steps of:
   writing measurement data to said magnetic recording medium by a write element and reading said written measurement data by a read element to measure signal quality while changing a write position and read position of said magnetic recording head in which said read element and said write element are separated; and
   determining a contour line on a two-dimensional map on said measured signal quality in said changed write position and read position, and calculating a write offset value and read offset value from the inflexion points of said contour line.

2. The offset measurement method for a magnetic recording head according to claim 1, wherein said calculation step comprises:
   a step of selecting a contour line other than the contour line with which signal quality is at the maximum, out of the contour lines on said two-dimensional map; and
   a step of calculating said write offset value and read offset value using the inflexion points of said selected contour line.

3. The offset measurement method for a magnetic recording head according to claim 1, wherein said calculation step further comprises:
   a step of determining a plurality of first inflexion points by differentiating said selected contour line in said write position direction;
   a step of determining said write offset value from said plurality of first inflexion points;
   a step of determining a plurality of second inflexion points by differentiating said selected contour line in said read direction; and
   a step of determining said read offset value from said plurality of second inflexion points.

4. The offset measurement method for a magnetic recording head according to claim 1, wherein said measurement step comprises:
   a step of reading servo information formed on said magnetic recording medium by said read element and changing the write position and read position of said magnetic recording head so as to position said magnetic recording head on said recording track; and
   a step of writing said measurement data on said recording track by said write element at said write position.

5. The offset measurement method for a magnetic recording head according to claim 1, wherein said measurement step further comprises:
   a step of positioning said magnetic recording head on a measurement target track of said magnetic recording medium, writing a measurement data on said magnetic recording medium by said write element, and while moving said magnetic recording head in the track crossing direction of said magnetic recording medium, reading said written measurement data at each position during said movement by said read element, so as to measure signal quality at each position of said movement; and a step of shifting the position of said magnetic recording head and repeating said measurement step.

6. The offset measurement method for a magnetic recording head according to claim 5, wherein said measurement step further comprises a step of moving said magnetic recording head in the track crossing direction of said magnetic recording medium in said read offset measurement range of said read element.

7. The offset measurement method for a magnetic recording head according to claim 5, wherein said repeating step comprises a step of shifting the position of said magnetic recording head in a predetermined range with said measurement target track as the center.

8. The offset measurement method for a magnetic recording head according to claim 1, further comprising a step of erasing a predetermined range with said measurement target track as the center by said write element.

9. A magnetic recording/reproducing device, comprising:
a magnetic recording medium on which recording tracks and record disabled areas are alternately formed;
a magnetic recording head in which a read element for reading data on said recording tracks and a write element for writing data on said recording tracks are separated;
an actuator for moving said magnetic recording head in a track crossing direction of said magnetic recording medium;
a table for storing an offset value of said read element and an offset value of said write element with respect to said recording track; and
a control unit for performing drive control for said actuator using the offset value of said read element and the offset value of said write element in said table,
wherein said table stores the offset value of said write element and the offset value of said read element which are calculated from the inflexion points of a contour line determined on a two-dimensional map on the measured signal quality by writing measurement data on said magnetic recording medium by said write element and reading said written measurement data by said read element, while changing the write position and read position of said magnetic recording head.

10. The magnetic recording/reproducing device according to claim 9, wherein said control unit executes measurement processing of the offset value of said write element and the offset value of said read element.

11. The magnetic recording/reproducing device according to claim 9, wherein said table stores the offset value of said write element and the offset value of said read element calculated using the inflexion points of a contour line other than the selected contour line with which said signal quality is at the maximum, out of the contour lines on said two-dimensional map.

12. The magnetic recording/reproducing device according to claim 9, wherein said table stores the offset value of said write element calculated from a plurality of first inflexion points determined by differentiating said selected contour line in the write position direction and an offset value of said read element calculated from a plurality of second inflexion points determined by differentiating said selected contour line in the read direction.

13. The magnetic recording/reproducing device according to claim 9, wherein said table stores the offset value of said write element and the offset value of said read element measured by reading servo information formed on said magnetic recording medium using said read element, changing the write position and read position of said magnetic recording head, and writing said measured data on said recording track using said write element at said write position.

14. The magnetic recording/reproducing device according to claim 9, wherein said table stores the offset value of said write element and the offset value of said read element acquired by positioning said magnetic recording head on a measurement target track of said magnetic recording medium, writing a measurement data on said magnetic recording medium by said write element, and while moving said magnetic recording head in the track crossing direction of said magnetic recording medium, reading said written measurement data at each position during said movement by said read element, so as to measure the signal quality at each position of said movement, and repeating said measurement with shifting the position of said magnetic recording head.

15. The magnetic recording/responding device according to claim 9, wherein said magnetic recording medium is a magnetic disk.

16. The magnetic recording/reproducing device according to claim 9, wherein said table stores the offset value of said write element and the offset value of said read element of each recording track of said magnetic recording medium.

17. The magnetic recording/reproducing device according to claim 9, wherein said table stores the offset value of said write element and the offset value of said read element, of a representative recording track of said magnetic recording medium,
and wherein said control unit determines the offset value of said write element and the offset value of said read element on a target track of said magnetic recording head by interpolation of the offset value of said write element and the offset value of said read element on said representative recording track.

18. The magnetic recording/reproducing device according to claim 10, wherein said control unit writes a measurement data to said magnetic recording medium by a write element, and reads said written measurement data by said read element while changing a write position and read position of said magnetic recording head, measures the signal quality, determines a contour line on a two-dimensional map on said measured signal quality in said changed write position and read position, and calculates a write offset value and read offset value from the inflexion points of said contour line.

19. The magnetic recording/reproducing device according to claim 18, wherein said control unit selects a contour line other than the contour line with which signal quality is at the maximum, out of the contour lines on said two-dimensional map, and calculates said write offset value and read offset value using the inflexion points of said selected contour line.

20. The magnetic recording/reproducing device according to claim 18, wherein said control unit determines a plurality of first inflexion points by differentiating said selected contour line in said write position direction, determines said write offset value from said plurality of first inflexion points, determines a plurality of second inflexion points by differentiating said selected contour line in said read direction, and determines said read offset value from said plurality of second inflexion points.

* * * * *